Dec. 31, 1935.        J. W. HOPE        2,025,987
AUTOMATIC RHEOSTAT CONTROL
Filed July 18, 1933        2 Sheets-Sheet 1

Inventor
John W. Hope
By *Lloyd W. Patch*
Attorney

Dec. 31, 1935.  J. W. HOPE  2,025,987
AUTOMATIC RHEOSTAT CONTROL
Filed July 18, 1933  2 Sheets-Sheet 2
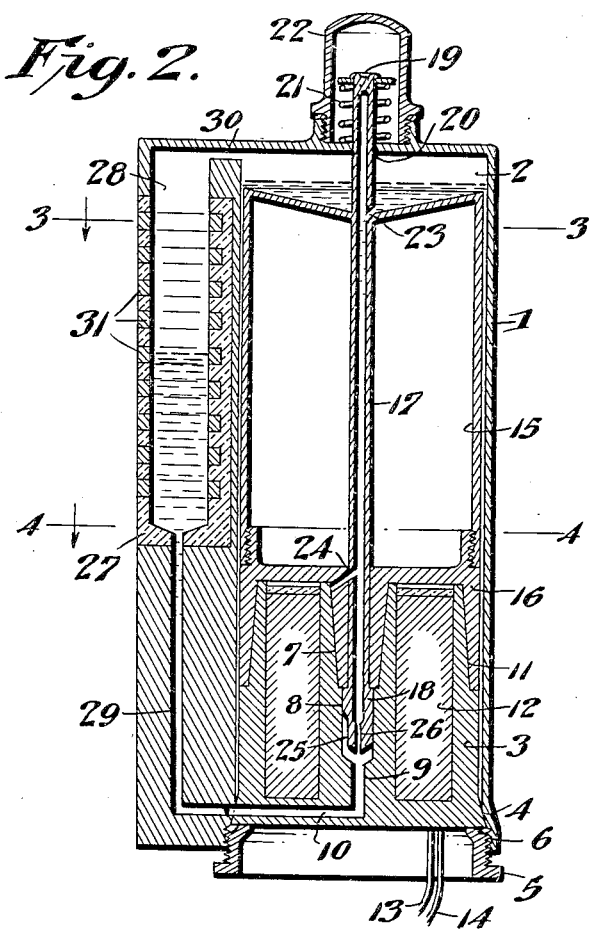
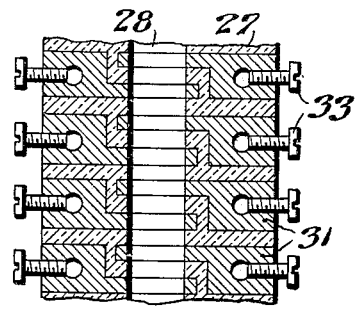
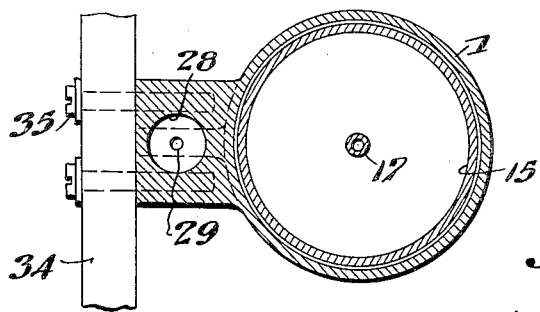
Inventor
John W. Hope
By Lloyd W. Patch
Attorney Patented Dec. 31, 1935

2,025,987

UNITED STATES PATENT OFFICE 2,025,987

AUTOMATIC RHEOSTAT CONTROL

John W. Hope, New York, N. Y.

Application July 18, 1933, Serial No. 681,025

5 Claims. (Cl. 201—48)

My invention relates to improvements in automatic rheostat controls, and particularly to a device of this character made in the form of an automatic control for the gradual reduction of resistance in an electric rheostat, or other electrically energized structure desired to be controlled by a step by step adjustment.

An object of my invention is to provide a control automatically thrown or operated immediately an electrical current conducting connection is established, so that the control parts will be gradually cut in, and as gradually cut out, within a predetermined given time and in regulated step by step controlled sequence.

Another object of my invention is to provide a device of this character which is automatic and positive in its operation, not requiring manual adjustment, setting or manipulation, either in cutting in or cutting out the various circuits.

Still another object is to so construct and mount the parts that the device and the operating portions are all embraced within a closed case, thus guarding against open sparking, and against unauthorized meddling with the parts to thus prevent or disturb proper operation.

Yet another object is to provide an automatic rheostat control of simple and inexpensive construction, with which the operation is truly and completely automatic in both cutting in and cutting out circuit connections, as well as restoring the parts to inoperative position for subsequent operation, thus adapting the control for ready and inexpensive installation in many connections where it has not heretofore been possible to employ such automatic controls.

With the above and other objects in view, which will be apparent to those skilled in the art, my invention includes certain novel features of construction and combinations of parts which will be hereinafter set forth in connection with the drawings and then pointed out in the claims.

In the drawings:

Fig. 2 is a vertical sectional view through the device.

Fig. 4 is a transverse sectional view on line 4—4 of Fig. 2.

Fig. 5 is a fragmentary sectional view substantially on line 5—5 of Fig. 3.

Figure 1:
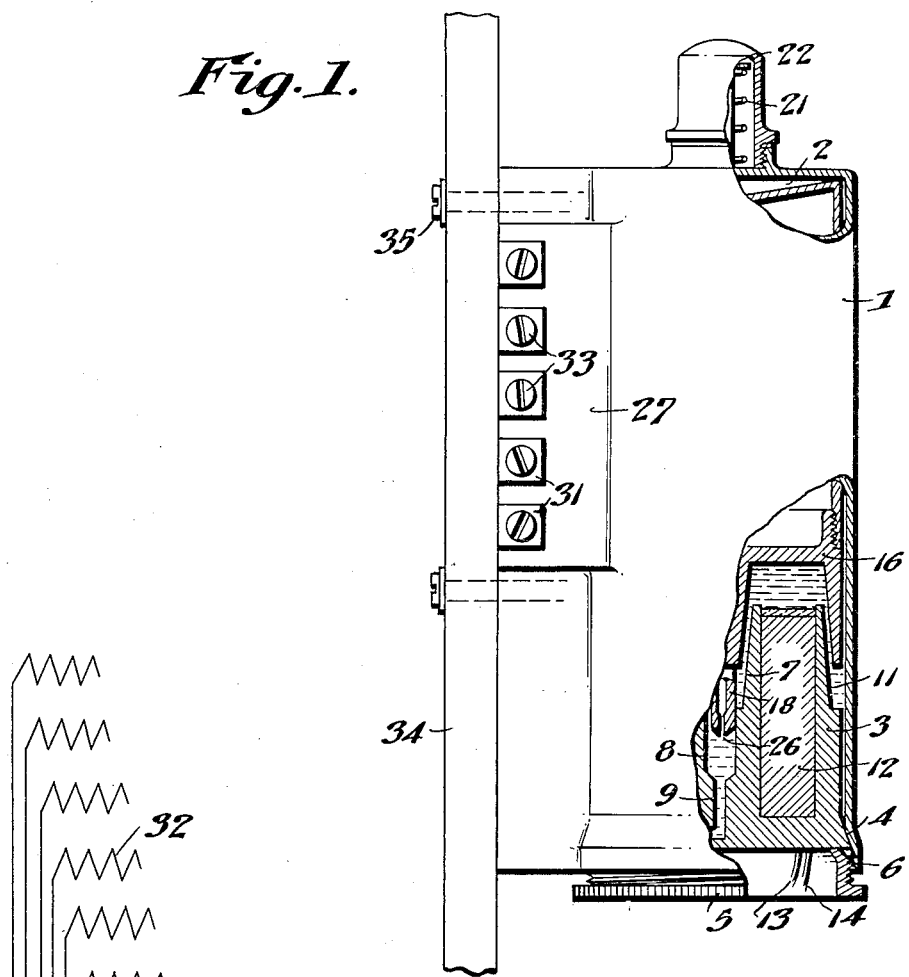
Figure 1 is a view in side elevation showing a control constructed in accordance with my invention, and with fragmentary parts broken away to better illustrate the construction.

My automatic control structure is primarily intended for use in connection with rheostats or other electrical devices adapted and connected for the control of electric current flowing to a motor, or other electrical appliance, and the purpose of the present invention is to provide automatic means that will gradually cut in and cut out the rheostat control by the simple operation of establishing a single electric circuit connection, as for instance operating a single switch.

A case 1 has a tubular opening 2 formed therein, and electromagnet 3 is adapted to be fitted in one end of the tubular opening 2 to close the same, the case 1 being formed with a head closing the other end of the tubular opening. This electromagnet 3 has a tapered flared portion 4 adapted to fit a correspondingly shaped portion at the end of the tubular opening 2, to thus hold the electromagnet 3 in proper position and insure a tight fit and closure of the electromagnet into the end of the tubular opening, a ring nut 5 being turned into the threaded end 6 of the tubular opening to clamp the electromagnet in place.

The electromagnet has a tapered aperture 7 formed centrally in the core thereof and this aperture continues in a guide passage 8 which leads into mercury conduit 9, this mercury conduit 9 being in communication with lateral conduit 10. The outer shell portion of the electromagnet 3 is reduced and tapered, as indicated at 11, and the coil 12 of the magnet is so wound that when a circuit connection is established through wires 13 and 14 the electromagnet is energized to attract toward its inner end.

A float 15 has an armature 16 carried at its lower end and corresponding substantially to the formation of the aperture 7 and the reduced portion 11 of the electromagnet, so that the full and maximum force of the electromagnet will be exerted upon the armature 16. This float 15 has a stem 17 extending centrally therethrough and terminating at one end in a guide portion 18 slidable in guide passage 8, the tube at its other end being formed as a guide extension 19 slidably received through a bearing opening 20 formed in the head end of the case 1. A spring 21 is provided to normally exert resilient force to raise the float member 15 to substantially the position illustrated in Figure 1, and a cap 22 is provided to close over the extending end 19 and consequently the bearing opening 20 so that case 1 has the tubular opening 2 thereof closed to be substantially fluid tight. A mercury flow duct 23 is provided through the tube 17 at the upper end of the float 15, and a mercury return duct 24 is provided laterally through the tube at the lower end of the float portion. The guide portion 18 of the stem has one side thereof flattened or cut away, as at 25, to clear the opening of the passage 8 when the float is raised to its uppermost position, and the passage through the tubular stem 17 is materially reduced in size to be substantially only a pin hole opening, as indicated at 26.

Figure 3:
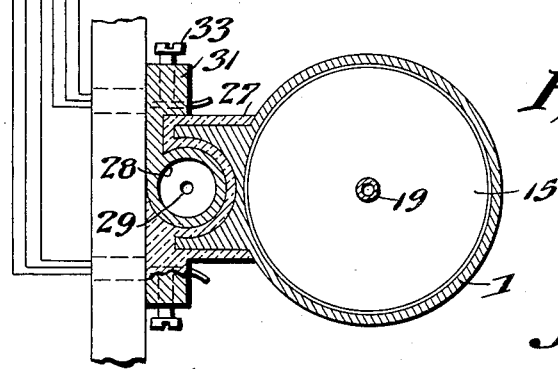
Fig. 3 is a transverse sectional view taken substantially on line 3—3 of Fig. 2.

At one side of the casing member 1, an insulating block 27 is set in and is formed with a mercury column opening 28, a duct or passage 29 being provided to connect the lower end of the mercury column opening 28 with the duct 10, and a vent opening being provided at 30 to vent the column 28 into the tubular opening 2. A plurality of contact members 31 are set into the insulating block 27 and are arranged along the mercury column opening 28, preferably in staggered relation and in equal spacing, as illustrated in Figs. 2 and 5. These contact members are each provided with openings to receive the ends of wires forming part of the circuit from the rheostat or other controlled unit, generally indicated at 32, and binding screws 33 are provided to insure a proper connection of the circuit wire with each of the contact members 31. As best shown in Fig. 3, it is perhaps preferable that the contact members 31 each be made to present a substantially ring-shaped portion around the mercury column opening 28, as this will insure full contact and a proper electrical conducting connection; however, this construction can be varied to suit different requirements of use.

The parts as above described are substantially self-contained, and the tubular opening 2 and mercury column opening 28 are sealed against ingress of atmospheric air so that the parts will operate uniformly and efficiently at all times. This case and unit can be mounted and supported in any desired manner, and in the present instance I have illustrated the case as positioned upon a panel 34, or other suitable support, and held in place thereon by screw bolts 35, although it will of course be understood that other manners and forms of mounting can be accomplished.

The float 15 is made of such diameter that it clears the wall of the tubular opening 2 to thus allow free sliding movement, and the only friction or contact of any part of the float member is through the portions 18 and 19 of the stem 17. These portions slide freely in their mountings, and consequently only very light pressure of the spring 21 is required to raise the float to the position illustrated in Figure 1. Further, with this substantially free floating mounting of the float, and the overlapping and tapered formation of the armature 16 and the effective portions of the electromagnet 3, the full attractive or drawing force of the magnet is exerted upon the float 15 when the circuit is completed through wires 13 and 14.

Mercury is filled into the tubular opening 2 to rise around the upper part of the electromagnet 3, when the float 15 is elevated, to such a height that the corresponding level in the mercury column opening 28 will be below the lowermost contact 31. Spring 21 will normally hold float 15 in this position when electromagnet 3 is de-energized, and as the magnet is energized the armature portion 16 is attracted toward the electromagnet 3 and the mercury escapes through duct 24, tube 17 and duct 23 to rise within the tube and over the top of the float 15. As the bearing end 18 of tubular stem 17 is moved into bearing passage 8, the flat portion 25 is covered and in consequence the only communication to passage 9 is through the pinhole opening 26. As the mercury elevated by downward movement of float 15 is raised to a high level in the tubular opening 2, the mercury will flow and escape by gravity through this pinhole opening 26, and carrying through passages 9, 10 and 29, will rise in the mercury column opening 28. As the column of mercury rises within the opening 28, it will successively bridge and connect the various contact members in the circuit, and the column of mercury will rise within this opening 28 until the mercury has leveled off in openings 2 and 28, the quantity of mercury being preferably such that the column in opening 28 will rise to nearly the top, or at least will take in each of the contact members desired to be included in the circuit. With this arrangement, the wires from the several contact members 31 probably extend to connect with various points on a rheostat or other control device, and as the mercury column rises in opening 28 rheostat coils, or other parts to be controlled, can be cut out of or cut into the circuit. Where connection is made to a rheostat so that resistance is gradually decreased as the column of mercury rises in opening 28, it may be found desirable to directly connect the highest contact member so that a direct circuit connection will be accomplished when the mercury column reaches a maximum level.

While I have herein shown and described only one specific embodiment of my invention and have set forth only certain possible modifications in connection and arrangement of the parts, it will be appreciated that many changes and variations can be made in the form, construction, arrangement and connection of the parts, to suit different conditions of operation and use, without departing from the spirit and scope of my invention.

I claim:

1. An automatic multiple circuit control comprising, an insulating member having a mercury column opening therein and a plurality of contacts exposed at spaced elevations along the length of said mercury column opening and each connected in one of said circuits, a chamber in communication with the mercury column opening containing a quantity of mercury normally leveling off below the lowermost contact, and a float movable within the chamber to be submerged within and to elevate the level of the mercury within said chamber and provided with a mercury flow duct by which mercury overflowing the float is conducted to the mercury column opening.

2. An automatic rheostat control comprising, an insulating member having a mercury column opening therein and a plurality of contacts exposed at spaced elevations along the length of said mercury column opening, resistance circuits to which said contacts are connected, a chamber in communication with the mercury column opening containing a quantity of mercury normally leveling off below the lowermost contact, a float movable within the chamber to be submerged within and to elevate the level of the mercury within said chamber and provided with a mercury flow duct by which mercury overflowing the float is conducted to the mercury column opening, and means operable to lower the float to cause submergence of the same so that mercury will pass through the mercury flow duct.

3. An automatic and timed rheostat control comprising, a member having a mercury column opening formed substantially perpendicularly therein and having a plurality of contacts exposed within the mercury column opening at spaced elevations, resistance circuits to which said contacts are connected, a mercury containing chamber in communication with the mercury column opening, an electromagnet at the bottom of said chamber, and a float movably received within the mercury chamber and provided with a skirted armature portion surrounding the electromagnetic means to be influenced thereby to lower the float to displace and be submerged in the mercury within the chamber, said float having a mercury passage therethrough to permit escape of mercury from within the skirted armature portion to overflow the float and being provided with a mercury flow duct through which the mercury overflowing the float is permitted to flow at measured rate to rise within the mercury column opening.

4. An automatic and timed rheostat control comprising, a member having a mercury column opening formed substantially perpendicularly therein and having a plurality of contacts exposed within the mercury column opening at spaced elevations, resistance circuits to which said contacts are connected, a mercury containing chamber in communication with the mercury column opening, an electromagnet at the bottom of said chamber, a float movably received within the mercury chamber and provided with a skirted armature portion surrounding the electromagnetic means to be influenced thereby to lower the float to displace and be submerged in the mercury within the chamber, said float having a mercury passage therethrough to permit escape of mercury from within the skirted armature portion to overflow the float and being provided with a mercury flow duct through which the mercury overflowing the float is permitted to flow at measured rate to rise within the mercury column opening, and means to initiate upward movement of the float when the overflowing mercury has been discharged.

5. An automatic rheostat control comprising, a plurality of rheostat resistance elements, a member having a mercury column opening in substantially perpendicular arrangement therein and provided with a plurality of rheostat connected contacts presented at spaced elevations along the height of the mercury column opening, a mercury chamber, ducts connecting the lower part of the mercury chamber with the lower part of the mercury opening, a displacement float member loosely received within the mercury chamber, a stem by which said displacement float is mounted to be guided in substantially perpendicular movement, said stem having a mercury conducting duct therethrough open at its upper end and provided with a restricted mercury flow controlling opening at its lower end, and means to lower and submerge the displacement float member to cause mercury to flow over the top thereof and through the duct to thus raise the level of mercury at measured rate within the mercury column opening to successively connect in the exposed contacts at successively higher elevations.

JOHN W. HOPE.